(12) United States Patent
O'Callaghan

(10) Patent No.: US 9,868,096 B2
(45) Date of Patent: Jan. 16, 2018

(54) RELATING TO BLENDERS

(71) Applicant: Vervant Limited, Dublin (IE)

(72) Inventor: James Joseph O'Callaghan, Dundalk (IE)

(73) Assignee: Vervant Limited, Dublin (IE)

( * ) Notice: Subject to any disclaimer, the term of this patent is extended or adjusted under 35 U.S.C. 154(b) by 195 days.

(21) Appl. No.: 14/845,715

(22) Filed: Sep. 4, 2015

(65) Prior Publication Data

US 2015/0375186 A1 Dec. 31, 2015

Related U.S. Application Data

(63) Continuation of application No. 13/597,770, filed on Aug. 29, 2012, now Pat. No. 9,126,352, which is a (Continued)

(30) Foreign Application Priority Data

Jul. 11, 2008 (IE) .................................. S2008/0574

(51) Int. Cl.
*B01F 15/06* (2006.01)
*B01F 15/02* (2006.01)
(Continued)

(52) U.S. Cl.
CPC .............. *B01F 15/067* (2013.01); *B01F 3/12* (2013.01); *B01F 3/184* (2013.01); *B01F 5/248* (2013.01); *B01F 7/007* (2013.01); *B01F 7/00416* (2013.01); *B01F 7/088* (2013.01); *B01F 13/1005* (2013.01); *B01F 15/0024* (2013.01); *B01F 15/00155* (2013.01); *B01F 15/00194* (2013.01); *B01F 15/00207* (2013.01); *B01F 15/00922* (2013.01); *B01F 15/0235* (2013.01);
(Continued)

(58) Field of Classification Search
CPC .............. B01F 15/0024; B01F 15/0235; B01F 2015/062; F26B 25/22; F26B 3/06
See application file for complete search history.

(56) References Cited

U.S. PATENT DOCUMENTS 155,704 A 10/1874 Burke
165,406 A 7/1875 Burke
(Continued)

FOREIGN PATENT DOCUMENTS

DE 2942325 A1 4/1981
DE 3537381 A1 5/1986
(Continued)

OTHER PUBLICATIONS

Soohoo, T., U.S. Appl. No. 12/501,761, Non-Final Office Action, dated Feb. 29, 2012, 10 pages.
(Continued)

*Primary Examiner* — Tony G Soohoo
(74) *Attorney, Agent, or Firm* — LaBatt, LLC

(57) ABSTRACT

A blender has a mixing chamber for reception of materials to be blended. A mixing screw is mounted at a bottom of the mixing chamber for mixing materials within the mixing chamber and delivering mixed materials to an outlet feeding a processing line. Heaters are mounted within the mixing chamber for drying blend material in the mixing chamber.

20 Claims, 14 Drawing Sheets

Related U.S. Application Data continuation of application No. 12/501,761, filed on Jul. 13, 2009, now abandoned.

(51) Int. Cl.

| | | |
|---|---|---|
| *B01F 3/12* | (2006.01) | |
| *B01F 3/18* | (2006.01) | |
| *B01F 5/24* | (2006.01) | |
| *B01F 7/00* | (2006.01) | |
| *B01F 7/08* | (2006.01) | |
| *B01F 13/10* | (2006.01) | |
| *B01F 15/04* | (2006.01) | |
| *B29B 7/14* | (2006.01) | |
| *B29B 7/88* | (2006.01) | |
| *B65G 65/46* | (2006.01) | |
| *B29B 7/22* | (2006.01) | |
| *B29B 13/06* | (2006.01) | |
| *F26B 3/06* | (2006.01) | |
| *F26B 25/22* | (2006.01) | |
| *B01F 15/00* | (2006.01) | |

(52) U.S. Cl.
CPC ...... *B01F 15/0267* (2013.01); *B01F 15/0287* (2013.01); *B01F 15/0292* (2013.01); *B01F 15/0445* (2013.01); *B01F 15/0483* (2013.01); *B01F 15/066* (2013.01); *B29B 7/14* (2013.01); *B29B 7/22* (2013.01); *B29B 7/88* (2013.01); *B29B 13/065* (2013.01); *B65G 65/46* (2013.01); *F26B 3/06* (2013.01); *F26B 25/22* (2013.01); *B01F 15/00123* (2013.01); *B01F 2015/062* (2013.01); *B01F 2215/0049* (2013.01)

(56) References Cited

U.S. PATENT DOCUMENTS

| | | | |
|---|---|---|---|
| 981,828 A | 1/1911 | Wallis | |
| 1,461,936 A | 7/1923 | Richards | |
| 2,274,359 A | 2/1942 | Chater | |
| 2,777,403 A | 1/1957 | Mladek | |
| 3,129,927 A * | 4/1964 | Mast | A01K 5/0216 366/157.2 |
| 3,193,155 A | 7/1965 | Hazen | |
| 3,366,368 A * | 1/1968 | Hibbing | B01F 13/1027 100/42 |
| 3,642,254 A | 2/1972 | Ternes | |
| 3,702,691 A | 11/1972 | Fritsch | |
| 4,101,116 A | 7/1978 | Haag et al. | |
| 4,189,063 A | 2/1980 | Matthiesen | |
| 4,445,848 A * | 5/1984 | Heller | C10C 3/007 126/343.5 A |
| 4,462,693 A * | 7/1984 | Buschbom | A01K 5/002 366/189 |
| 4,658,891 A * | 4/1987 | Wurtz | F28F 13/125 165/92 |
| 4,759,633 A | 7/1988 | Schmid | |
| 4,790,457 A | 12/1988 | Morse et al. | |
| 4,876,116 A | 10/1989 | Mehan et al. | |
| 5,085,025 A | 2/1992 | Gaddis | |
| 5,120,217 A * | 6/1992 | O'Brien | E01C 19/1004 126/343.5 R |
| 5,148,943 A | 9/1992 | Moller | |
| 5,299,888 A | 4/1994 | Wysong et al. | |
| 5,527,107 A | 6/1996 | Weibel et al. | |
| 5,851,121 A | 12/1998 | Thenaisie et al. | |
| 5,876,116 A | 3/1999 | Barker et al. | |
| 5,899,391 A | 5/1999 | Goehner et al. | |
| 5,967,657 A * | 10/1999 | West | A01K 5/002 366/193 |
| 6,030,112 A | 2/2000 | Milek | |
| 6,079,118 A * | 6/2000 | Kiyokawa | F26B 17/20 34/134 |
| 6,155,709 A | 12/2000 | O'Callaghan | |
| 6,203,184 B1 | 3/2001 | O'Callaghan | |
| 2012/0066924 A1 * | 3/2012 | Ando | A23B 9/04 34/90 |

FOREIGN PATENT DOCUMENTS

| | | |
|---|---|---|
| EP | 0911130 A2 | 4/1998 |
| EP | 1236774 A2 | 9/2002 |
| EP | 1304304 A2 | 4/2003 |
| EP | 0911130 B1 | 5/2003 |
| EP | 2011563 A1 | 1/2009 |
| FR | 2746917 A1 | 10/1997 |
| GB | 2305133 A | 9/1995 |

OTHER PUBLICATIONS

Soohoo, T., U.S. Appl. No. 13/597,770, Notice of Allowance, dated May 8, 2015, 5 pages.
Soohoo, T., U.S. Appl. No. 13/597,770, Final Office Action, dated Nov. 3, 2014, 9 pages.
Soohoo, T., U.S. Appl. No. 13/597,770, Non-Final Office Action, dated Mar. 20, 2014, 13 pages.

* cited by examiner

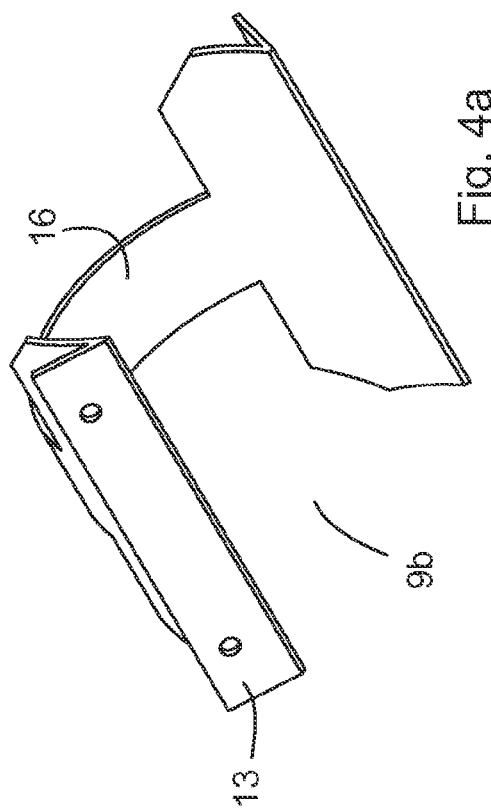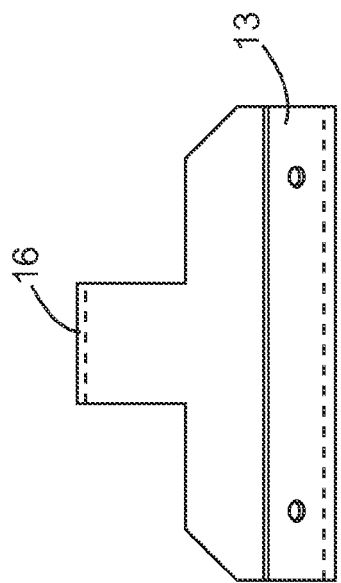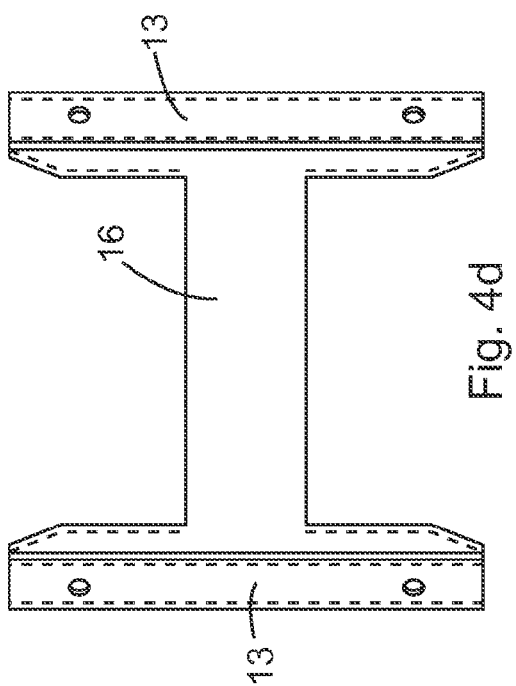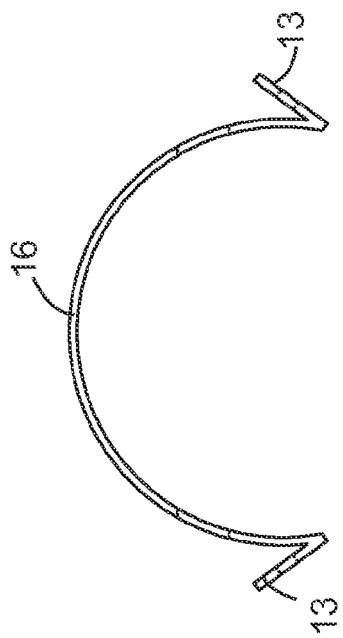

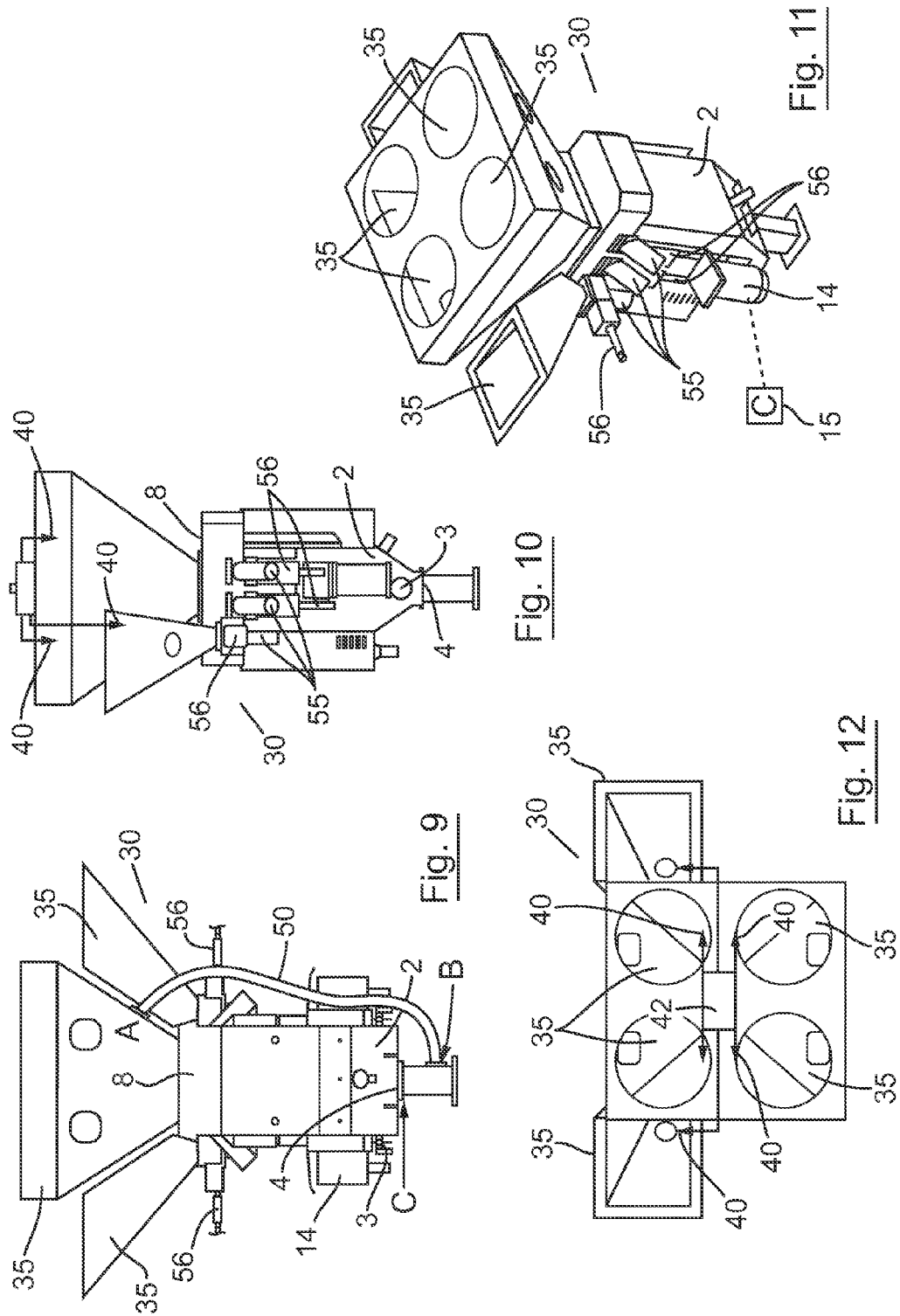

RELATING TO BLENDERS

REFERENCE TO RELATED APPLICATIONS

The current application is a continuation of U.S. Utility application Ser. No. 13/597,770 which was filed on 29 Aug. 2012 and issued as U.S. Pat. No. 9,126,352 on 8 Sep. 2015, and which is a continuation of U.S. Utility application Ser. No. 12/501,761, which was filed on 13 Jul. 2009, both of which are hereby incorporated by reference.

INTRODUCTION

This invention relates to blenders for various processes but may also be used in other applications.

The invention particularly relates to blenders for the controlled mixing and delivery of particulate blend additives into a material processing line, for extruding plastics material for example. Examples of such blenders are to be found in our previous patent no's: U.S. Pat. No. 6,155,709 and U.S. Pat. No. 6,203,184. A problem can arise in handling low bulk density materials such as regrind flake in accurately mixing and feeding material mixtures containing such low bulk density materials. Further, such blenders are commonly used for batch production processes. It is therefore necessary to regularly clean out all the raw materials from a current batch production before setting up the blender for a new batch production run for another product. This is typically done manually. However, these blenders are often in somewhat inaccessible and elevated locations. Thus, cleaning can present a safety hazard to workers and there is also a danger that they will damage other machinery in gaining access to the blender for cleaning. Another problem that can arise is with regard to the moisture content of the ingredient raw materials. Typically dryers are provided upstream of a blender for drying the raw materials. However as the raw materials are delivered to and through the blender the moisture content can increase due to contact with ambient air. This is undesirable and adversely affects production quality.

The present invention is directed towards overcoming these problems.

SUMMARY OF THE INVENTION

According to the invention there is provided a discharge system for a material chamber having a material outlet, said discharge system including a material feeder to deliver material from the chamber to the outlet, a baffle mounted adjacent, but spaced-apart from the outlet, the feeder having a discharge portion which is mounted between the baffle and the outlet.

In one embodiment of the invention the baffle has at least one opening therein to allow through-passage of material on the one hand but to exert downward pressure on material being fed to the outlet thus forcing the material downward through the outlet.

In another embodiment the baffle is a grating. Alternatively the baffle may be a strap or band mounted across the outlet. Preferably an arcuate band is provided.

In a further embodiment the baffle wraps around the feeder at the outlet.

In another embodiment the feeder has drive means, said drive means being at a constant speed or adjustable to vary the rate of delivery of material to the outlet.

Conveniently the drive means may be reversible.

In another embodiment a mixer is mounted in the chamber. The mixer may be mounted above the feeder for mixing of material prior to delivery to the feeder.

In another embodiment the feeder is a feed screw.

In another embodiment the feed screw has a pair of opposed screws or paddles which are operable to direct material inwardly from each end of the mixer or mixing chamber to the material outlet.

In a preferred embodiment the feed screw has a pair of opposed screws which are operable to direct material inwardly from each end of the screw to a central portion of the screw, said central portion being located at the material outlet.

In a further embodiment, the invention provides a material blender incorporating the discharge system.

In a preferred embodiment, the chamber forms a mixing chamber of the material blender.

In another aspect the invention provides a material blender having a mixing chamber with a material outlet for connection to a process line wherein means is provided at the outlet for cramming material through the outlet.

In another embodiment said means is a screw feeder mounted in an outlet duct below the blender chamber material outlet extending outwardly from the outlet.

In another aspect the invention provides a blender having a weigh hopper above the mixing chamber for weighing a batch of raw material and delivering said batch to the mixing chamber, a material level sensor being located above the material in the mixing chamber below the weigh hopper, the level sensor being operable to provide a continuous reading of the material level in the mixing chamber. This may be used to measure the material remaining in the mixing chamber at any point in time. From this data a continuous measurement can be made of the material usage of the process being fed from the outlet of the blender.

Beneficially this reading can be referenced to the absolute material usage calculation available by summing the weight of each batch being weighed by the blender from time to time.

In another aspect, the invention provides a blender having a plurality of material handling or storage compartments, one or more cleaning air jets being provided at each compartment, said air jets being operable to direct material towards an outlet of the compartment, means for connecting said cleaning air jets to a pressurised air supply, and valve means to control delivery of pressurised air to each cleaning air jet.

In another embodiment the air jets are replaced or complemented by ultrasonic actuators or vibrating actuators.

In one embodiment, there is provided actuating means for switching each valve between an open position and a closed position, said actuating means being connected to a controller which is operable either manually or automatically to control switching of the valves.

In a further embodiment the controller is operable to switch the valves between open and closed positions in a preset desired sequence during a cleaning cycle.

In another embodiment, the blender has a raw material storage bin at an inlet of the blender and an outlet for delivery of material to a process line, a material bypass line connected between said raw material storage bin and said outlet, and a bypass material flow valve mounted in said bypass line to control delivery of material through the bypass line.

In another embodiment a blender discharge stop valve is mounted at the blender outlet upstream of the bypass line to control discharge of blended material from the blender into the process line.

In another embodiment the blender has a number of raw material supply bins at an inlet of the blender, each raw material supply bin having a drain chute, a drain valve being mounted in the drain chute to control discharge of material from the raw material supply bin through the drain chute to empty same.

In another embodiment each of the bypass valve, the discharge stop valve, and the drain valves may be provided with an actuator for switching the valve between an open position and a closed position, said actuator being connected to the controller which is operable to control switching of the valve, or to a manual control means.

In another embodiment each material supply bin has a pressurised air supply connected to it which may be actuated via a control means to purge remaining material from the supply bin via the associated drain chute, thus providing complete cleaning of the supply bin.

In a further embodiment, the controller is operable for synchronising operation of the valves with each cleaning cycle.

According to another aspect of the invention there is provided a batch blender including a mixing chamber, means for forming a batch of one or more dry ingredient materials for delivery to the mixing chamber, and means for delivering a measured quantity of a liquid ingredient material with an associated batch of dry ingredient materials to the mixing chamber.

In one embodiment the means is provided for weighing the quantity of liquid ingredient materials associated with the batch of dry ingredient materials.

In another embodiment the means for delivering the liquid ingredient material to the mixing chamber is a liquid holding vessel having an inlet and outlet, said inlet to be connected to a liquid supply for reception of the liquid ingredient material, the outlet for discharge of liquid ingredient material to the mixing chamber.

In a further embodiment the liquid holding vessel is supported on weighing means.

In one embodiment of the invention the means for delivering the liquid ingredient material to the mixing chamber is operatively connected to means for delivering the batch of dry ingredient materials to the mixing chamber.

In another embodiment the means for forming a batch of dry ingredient materials comprises a weigh hopper having an inlet for reception of dry ingredient materials and an outlet for delivery of material from the weigh hopper to the mixing chamber, said outlet being closed by a discharge valve, opening of said discharge valve controlling delivery of the liquid ingredient material to the mixing chamber.

In another embodiment the means for delivering the liquid ingredient material to the mixing chamber is a liquid holding vessel having an inlet and outlet, said inlet being connected to a liquid supply for reception of a measured quantity of liquid ingredient material, said liquid holding vessel being movable between a filling position and a pouring position for pouring liquid through the outlet into the mixing chamber, the discharge valve on the weigh hopper and the liquid holding vessel being operatively connected such that opening of the discharge valve on the weigh hopper causes movement of the liquid holding vessel between the filling position and the pouring position for delivery of liquid ingredient material to the mixing chamber.

In another embodiment the discharge valve is a dump flap mounted at the outlet of the weigh hopper which is movable between a closed position sealing the outlet and an open position which allows discharge of dry ingredient materials from the weigh hopper to the mixing chamber, the liquid holding vessel being mounted on the dump flap, when the dump flap is closed the holding vessel being supported in the filling position and when the dump flap is open the holding vessel being supported in the pouring position.

In another aspect the invention provides a blender having a mixing chamber for mixing ingredient materials characterised in that a heater is mounted in the mixing chamber for drying the ingredient materials in the mixing chamber.

In another embodiment a moisture content sensor is mounted within the mixing chamber and the heater is operable in response to sensed moisture content to maintain a material within the mixing chamber at a pre-set desired moisture content.

In another embodiment a gas transfer manifold is mounted within the mixing chamber having a number of openings communicating with the mixing chamber and means is provided for injecting or extracting a gas through the manifold for regulating moisture content within the mixing chamber.

In another embodiment the manifold forms a shaft of a mixing screw mounted within the mixing chamber.

In a further embodiment a material feeder is mounted within the mixing chamber for delivering material to an outlet of the chamber, said material feeder being operable to direct portion of the material towards the outlet and portion of the material away from the outlet for re-mixing in the mixing chamber, an upright tubular feed controller mounted above the outlet for directing material away from the outlet, said tubular feed controller being of double walled construction and having openings in a side wall thereof to form a manifold for injecting air or gas.

BRIEF DESCRIPTION OF THE DRAWINGS

The invention will be more clearly understood by the following description of some embodiments thereof, given by way of example only with reference to the accompanying drawings, in which:

FIG. 4a-FIG. 4d show various views of another baffle;

FIG. 9 is a further elevational view of the blender shown in FIG. 7;

FIG. 10 is a side elevational view of the blender shown in FIG. 7;

FIG. 11 is a perspective view of the blender shown in FIG. 7;

FIG. 12 is plan view of the blender shown in FIG. 7;

DETAILED DESCRIPTION OF PREFERRED EMBODIMENTS

Figure 1:
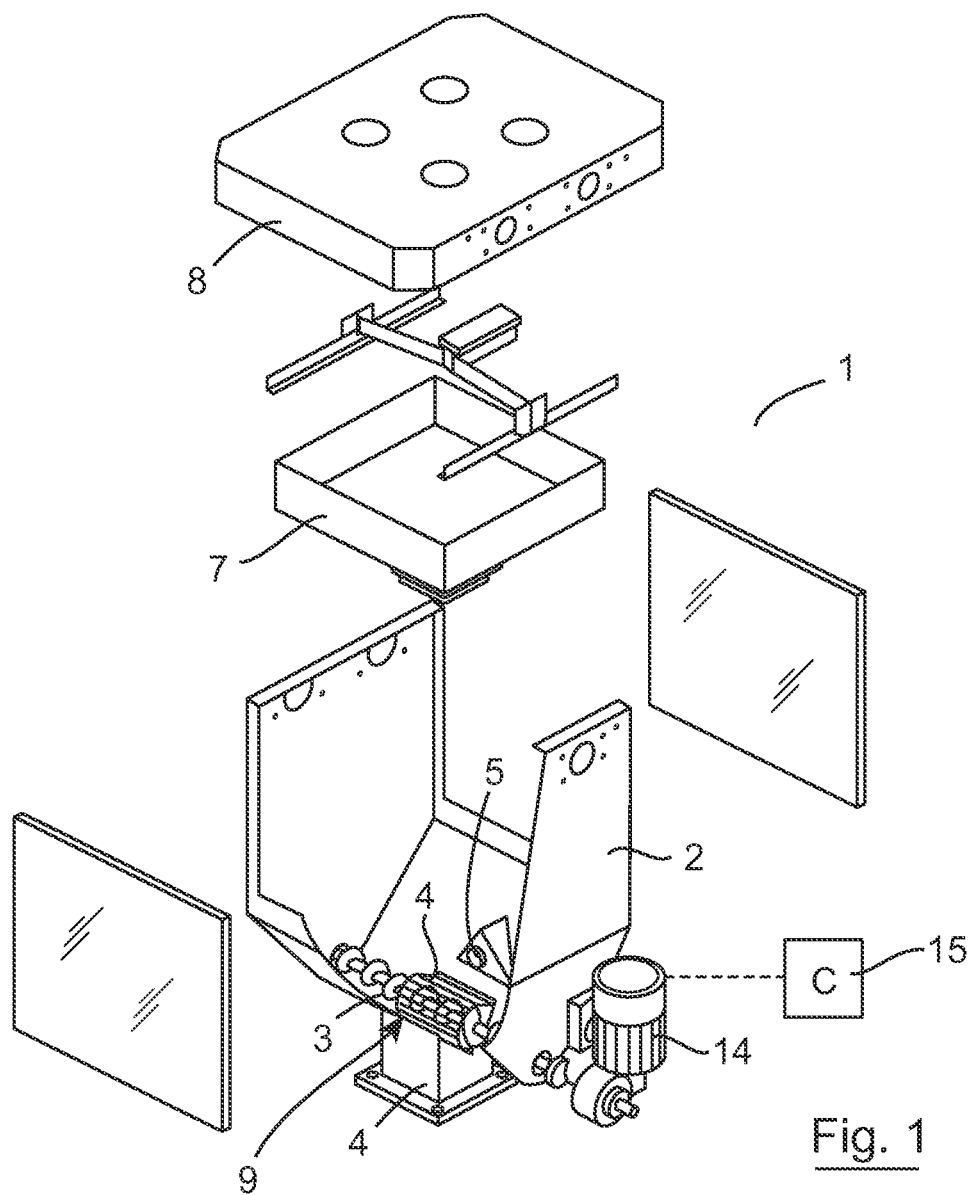
FIG. 1 is an exploded perspective view of a blender.
Figure 2:
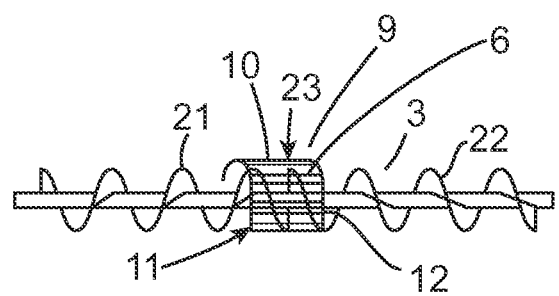
FIG. 2 is a detail elevational view of portion of the blender of FIG. 1.

Referring to the drawings, and initially to FIGS. 1 and 2 thereof, there is illustrated a blender indicated generally by the reference numeral 1. The blender 1 is largely similar to our blender described in European Patent Specification No. 0 911 130. The blender 1 has a mixing chamber 2 for reception of materials to be blended. A mixing screw 3 is mounted at a bottom of the mixing chamber 2 adjacent an outlet 4 of the mixing chamber 2 for circulation and mixing of materials within the mixing chamber 2 prior to discharge through the outlet 4. A material level sensor 5 is mounted within the chamber 2 above the screw 3. The level sensor 5 is connected to a controller 15 which is operable to regulate the supply of fresh materials from a weigh hopper 7 to the mixing chamber 2 for mixing. A number of raw material supply bins (not shown) are mounted above a support platform 8 located above the weigh hopper 7 for feeding selected raw material ingredients to the weigh hopper 7. In accordance with the present invention a baffle grating 9 is mounted at the outlet 4, extending closely around the mixing screw 3. The baffle grating 9 is such that it tends to inhibit upward movement of material at the outlet 4, thus tending to cram material into the outlet 4.

The baffle grating 9 essentially comprises a number of spaced-apart substantially parallel bars 10 mounted between a pair of arcuate end members 11, 12. The baffle grating 9 is fixed to the wall of the chamber 2 at opposite sides of the outlet 4.

The mixing screw 3 has a pair of opposed screw blades or paddles 21, 22 which are operable to direct material inwardly from each end of the mixing screw 3 to a central portion 23 of the mixing screw 3, said central portion 23 being located at the material outlet 4. Thus, the mixing screw 3 moves material inwardly from each end of the mixing screw 3 or mixing chamber 2 towards the outlet 4, some of the material then falling through the outlet 4 and the rest of the material being urged upwardly by following material for recirculation upwardly and then outwardly for feeding again by the mixing screw 3 towards the outlet 4. The provision of the baffle grating 9 resists the upward movement of the material at the outlet 4 and thus has a cramming action on the material at the outlet 4. The openings 6 between the bars 10 of the baffle grating 9 are such as to allow the normal mixing action of the blender 1 to occur, while at the same time increase the downward pressure of the mixed material through the outlet 4 of the mixing chamber 2. Advantageously this allows the blender 1 to be used for mixing and feeding greater amounts of low bulk density material such as regrind flake. This provides both a financial and an ecological benefit to the user. The cramming action provided by the baffle grating 9 can be adjusted by adjusting the spacing between the bars 10 and by adjusting the height of the baffle above the screw 3. The cramming action can also be improved and controlled by varying the speed of the mixing screw 3. Adjustment of the mixing screw 3 speed may also be used to vary the feed rate of blended material discharged through the outlet 4 thus combining blending and feed rate control.

It will be noted also that when the mixing screw 3 is stopped material will not flow by gravity through the outlet 4 as the baffle grating 9 may be designed to prevent this flow. Thus, the baffle grating 9 enables the flow of material to be stopped without intervention of some form of stop valve or gate as would otherwise be the case. Further, short term reversing of the mixing screw 3 enhances this feature by removing material below the baffle grating 9 from the vicinity of the outlet 4.

A drive motor 14 is driveably connected to the mixing screw 3. The drive motor 14 is connected to an associated controller 15 for controlling operation of the drive motor 14. This controller 14 is operable to control the speed of the drive motor 14.

In use, a batch of material to be blended is weighed in the weigh hopper 7 and then discharged when required into the mixing chamber 2. Within the mixing chamber 2, the mixing screw 3 circulates the material within the mixing chamber 2 to mix the material. The material is delivered inwardly from each end of the mixing screw 3 and then tends to push upwardly and outwardly for mixing and downwardly through the outlet 4. The upward movement is resisted somewhat by the baffle grating 19 which tends to cram material at the outlet 4 for feeding into a process line.

It is envisaged that a separate mixer might be provided within the mixing chamber 2 above the mixing screw 3 for added mixing of the material. In this case, it may be possible to provide the baffle 9 as an arcuate sheet mounted across the outlet opening 4 to prevent any upward movement of material from the mixing screw 3 to further enhance the downward cramming action as the material is delivered towards the outlet 4 by the mixing screw 3.

Figure 3:
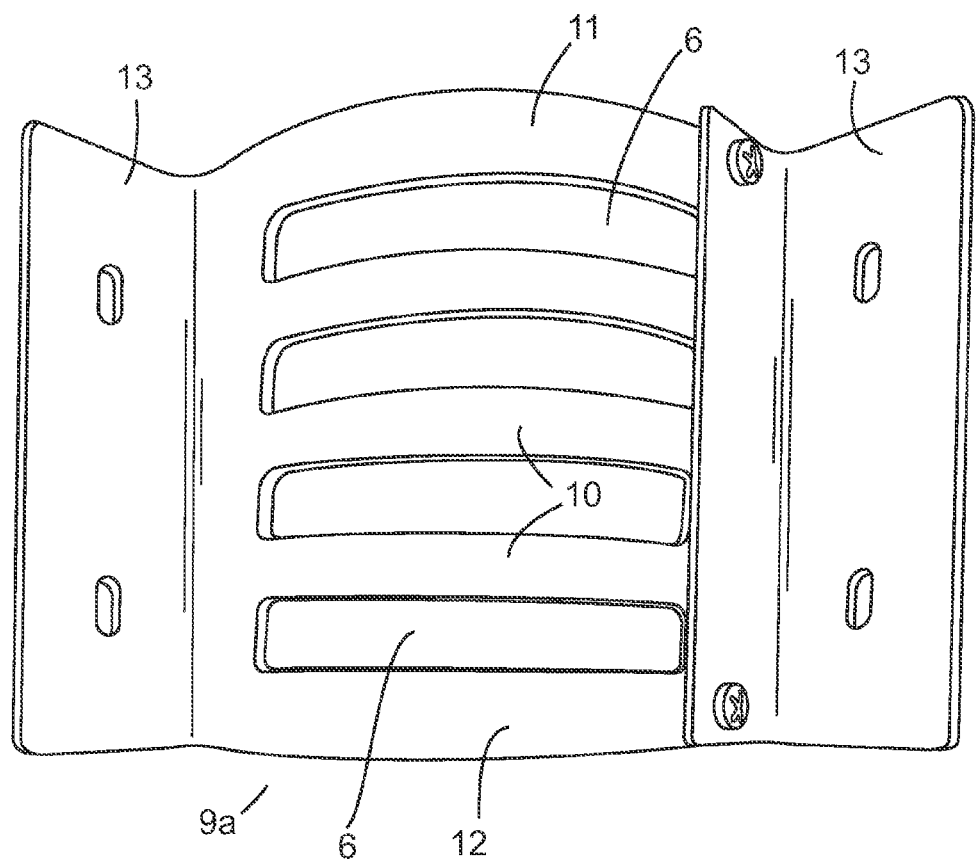
FIG. 3 is a plan view of a baffle portion of the blender of FIG. 1.

Referring now to FIG. 3, there is shown another baffle 9a which is largely similar to the baffle 9 shown in FIG. 1 and FIG. 2. In this case however the bars 10 have the same arcuate shape as the end members 11, 12 and are generally parallel thereto. Flanges 13 at each side of the baffle 9a are bolted to a side wall of the mixing chamber 2 to mount the baffle 9a in the mixing chamber 2.

Figure 5:
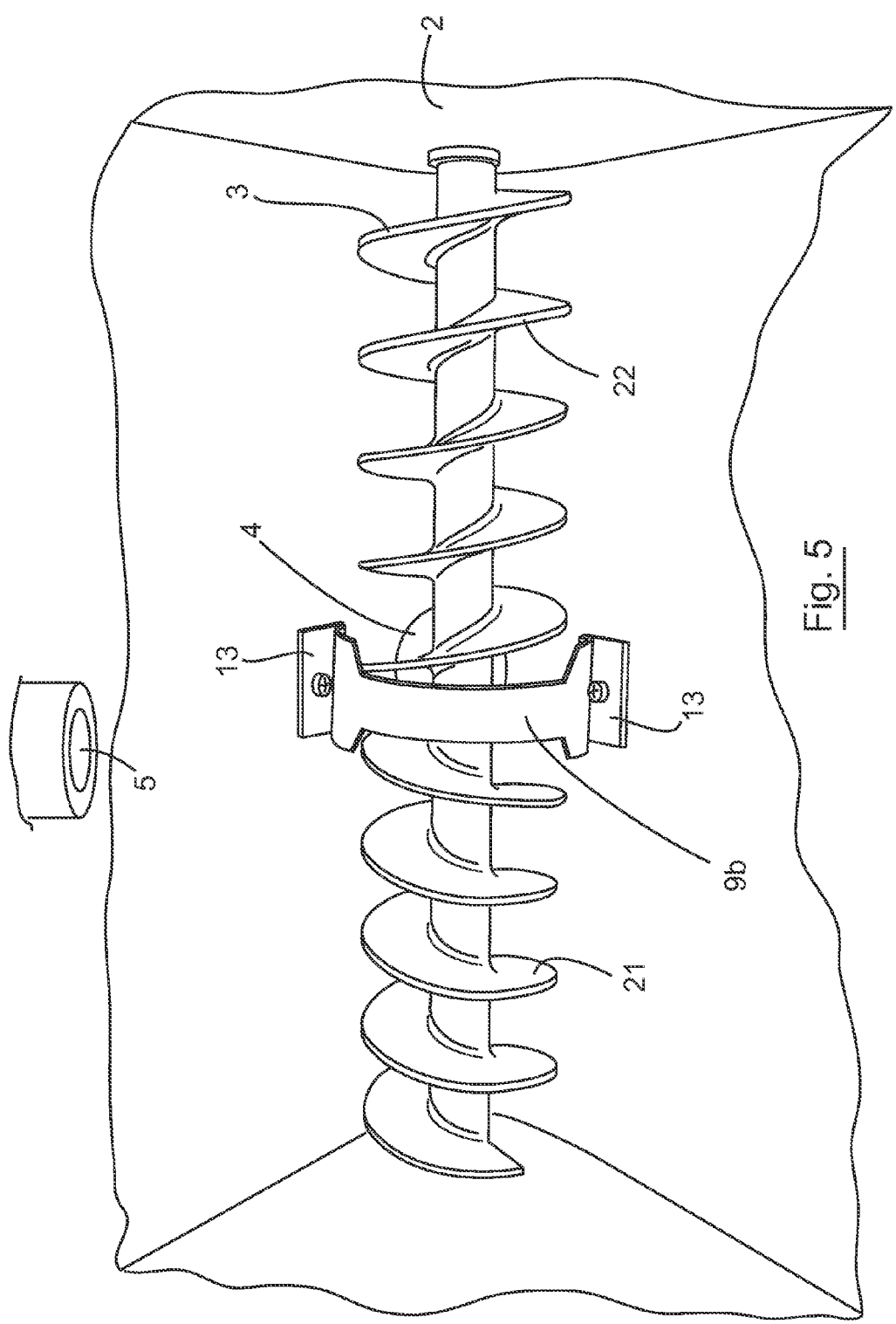
FIG. 5 is a plan view of the baffle shown in FIG. 4 mounted in the blender of FIG. 1.

Referring now to FIG. 4 and FIG. 5, there is shown another baffle 9b. In this case the baffle 9b forms a single arcuate band 16 which curves around the mixing screw 3 above the mixing screw 3 at the opening 4 as illustrated in FIG. 5. The baffle 9b is mounted centrally above the outlet 4 and is narrower than the outlet opening 4.

Figure 6:
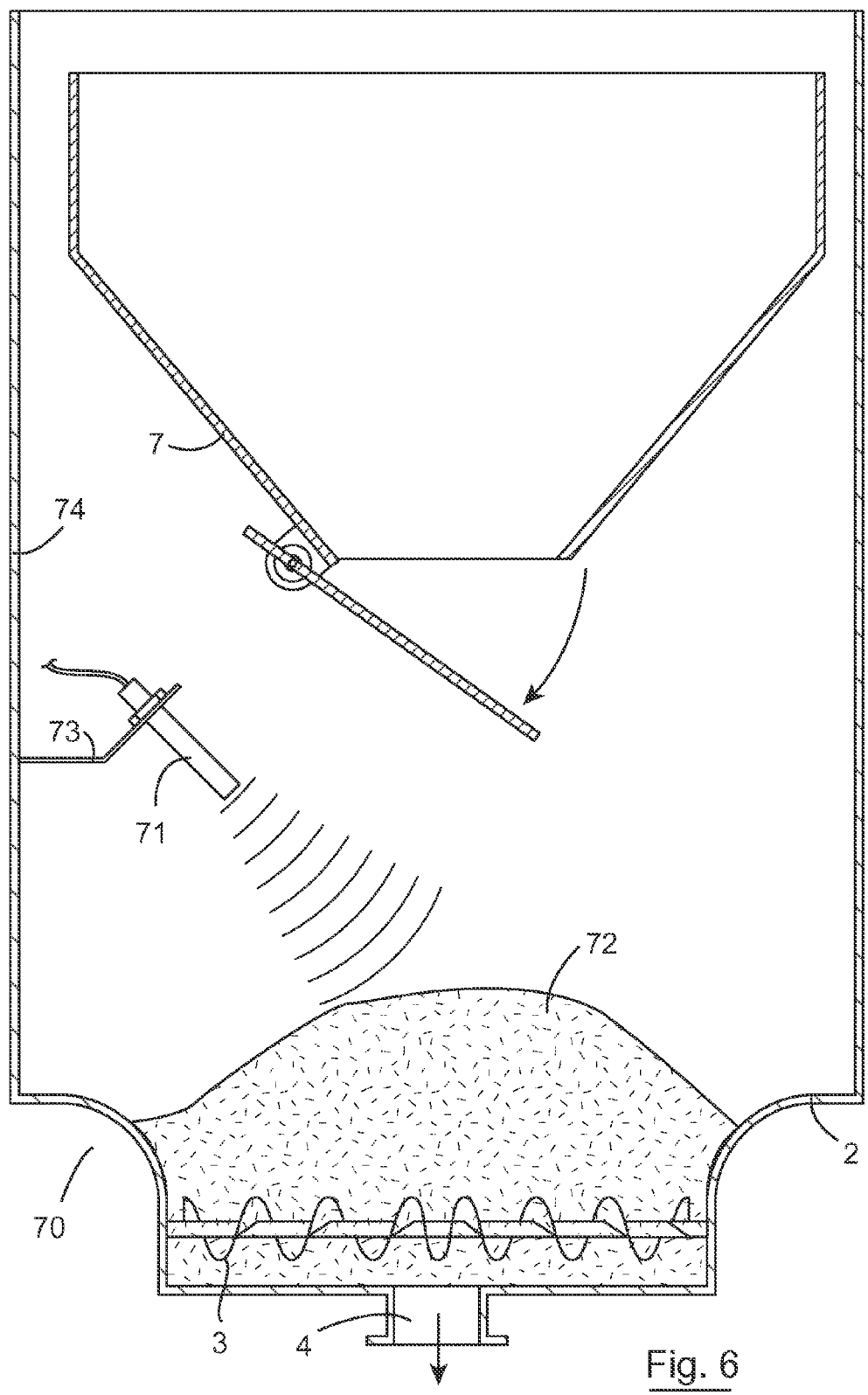
FIG. 6 is a schematic sectional elevational view of another blender.

Referring to FIG. 6, there is shown another blender 70. Parts similar to those described previously are assigned the same reference numerals. The blender 70 has a weigh hopper 7 above the mixing chamber 2 for weighing a batch of raw material and delivering said batch when required to the mixing chamber 2 for mixing and subsequent discharge through the outlet 4 into a process line. In this case a level sensor 71 with a continuous read-out is mounted within the mixing chamber 2 by means of a mounting bracket 73 attached to a side wall 74 of the mixing chamber 2. Conveniently the level sensor 71 is an ultrasonic sensor (however other level sensing means could also be used). The level sensor 71 is operably connected to the controller 15. The level sensor 71 is used to measure the amount of material 72 in the mixing chamber 2 at any point in time. This measured amount changes as material 72 leaves the mixing chamber and is consumed by the process being fed by the blender 70. Using the consumption of material calculated after each batch made by the blender has a reference, the level sensor 71 read-out be can then be beneficially used to provide a rapid continuous read-out of consumption of material by the process between batches which may allow faster control of the process.

Figure 7:
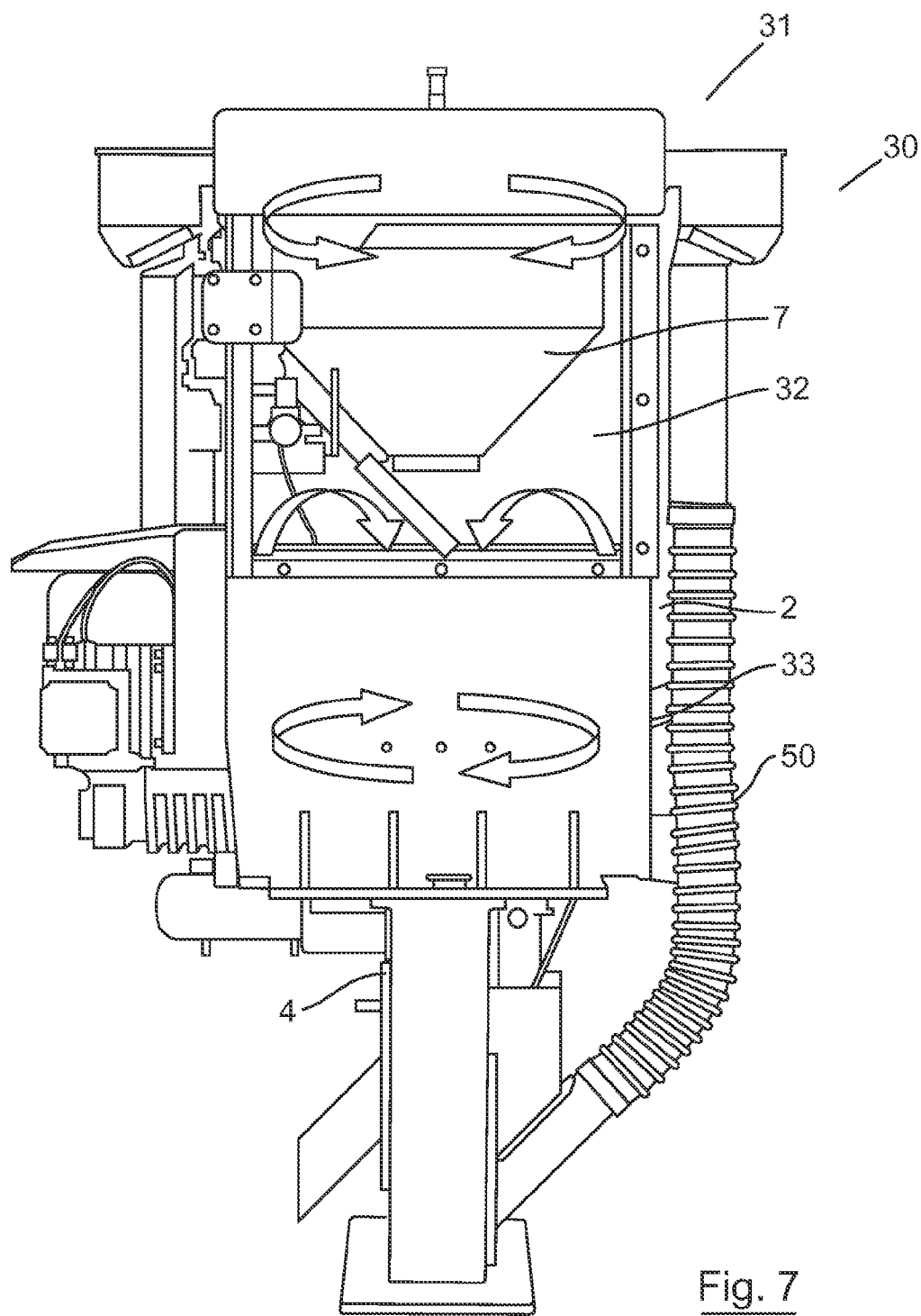
FIG. 7 is an elevational view of another blender.
Figure 8:
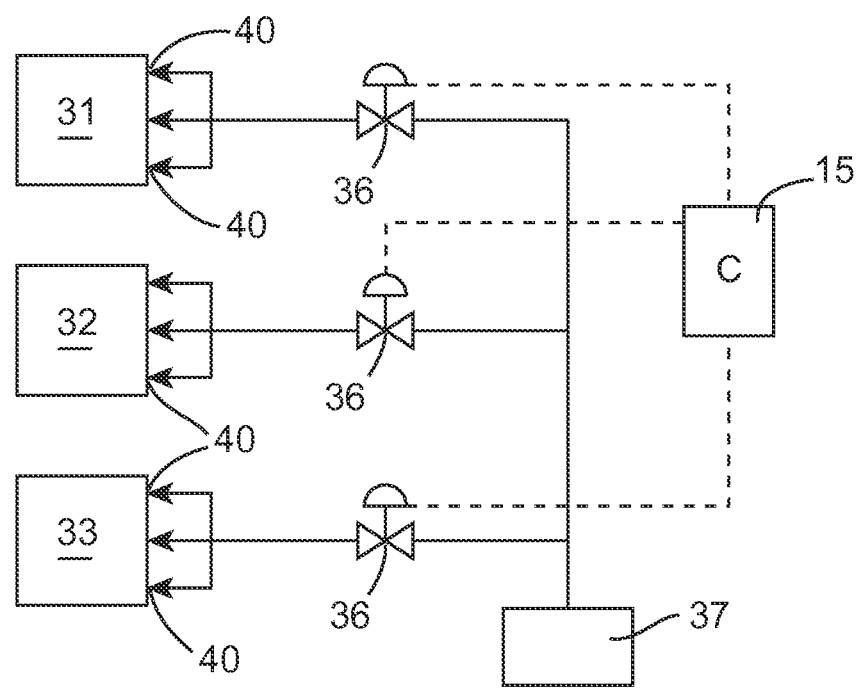
FIG. 8 is a schematic illustration of a cleaning system for the blender.

Referring now to FIGS. 7 to 12 there is illustrated another blender, indicated generally by the reference numeral 30. Parts similar to those described previously are assigned the same reference numerals. The blender 30 has a number of material handling compartments in three main sections, namely an upper section 31, a central section 32 and a lower section 33. The upper section 31 comprises a number of raw material storage bins 35 mounted on the platform 8 above the weigher 7. The central section 32 comprises the central portion of the blender 30 between the weigher 7 and the mixing chamber 2. The lower section 33 comprises the mixing chamber 2 of the blender 30. A number of cleaning air jets 40, only some of which are shown, are provided at each compartment. FIG. 8 shows the air jets 40 arranged for the storage bins 35. These air jets 40 are operable to direct material within the storage bins 35 towards an outlet of the storage bins 35 for cleaning out the storage bins 35. The jets 40 are connected to a pressurised air supply via a purge actuator 42 which acts as a valve to switch on and off the pressurised air supply to the jets 40. Advantageously the air supply will be connected to an air accumulator mounted adjacent to the air discharge source thus providing maximum air volume for cleaning.

Separate actuators 42 are provided for each section 31, 32, 33 so that a sequential cleaning of the blender 30 may be achieved from top to bottom. These actuators 42 may be connected to the controller 15 which controls operation of the cleaning cycle. It will be appreciated that the air jets 40 are arranged to clean away accumulated material or dust within the various material storage compartments supplying the blender 30. If desired, the air jets 40 may be pulsed for greater effect.

FIG. 8 shows the arrangements schematically valves 36 controlling supply of pressurised air from a pressurised air source 37 to the air jets 40 are connected to the controller 15 for controlling operation of the air jets 40 as required.

In use, the blender 30 is operated as normal. When it is necessary to change the raw materials in the supply bins 35 for a different process the bins 35 are evacuated and the air jets 40 operated to clean out any residual dust or material from the storage bins and the rest of the blender 30. The drains 55 may be used both to drain the material and exit residual dust during the cleaning processes referred to above.

Referring in particular to FIGS. 7 and 9, a raw material bypass line 50 is connected between a raw material storage bin 35 and the outlet 4 so that raw material may be fed directly from the storage bin 35 to the outlet 4 and hence in to the process line during the cleaning cycle. This material flow may be controlled by a ram operated slide gate valve mounted at either location A (FIG. 9) on the storage bin 35 at the inlet of the bypass line 50, or location B (FIG. 9) at an outlet end of the bypass line 50. A blender discharge stop valve C (FIG. 9) may also be mounted at the outlet 4 upstream of the outlet of the bypass line 50 to control discharge of blended material from the blender mixing chamber 2 into the process line. This valve C may also be conveniently ram operated. The slide gate valve C may be used to close off the flow of material from the next recipe within the mixing chamber 2 until the new recipe is sufficiently mixed by the mixing screw 3. Only then will the mixed material be allowed to enter the process line by opening the slide gate valve C.

Advantageously, the process may be completely automated thus allowing complete order/recipe changes without interrupting or stopping the process, while avoiding cross-contamination of materials between recipes because of the automated cleaning and bypass systems mentioned above. All the various valves for controlling the flow of material through the blender may have their operating rams connected to the controller 15 for appropriate control and operation of the valves.

Drain chutes 55 are provided for easy drainage of raw materials from the various storage bins 35. A ram operated slide valve is provided at an inlet to each of these chutes 55 and these can be operated by the controller 15 to ensure quick and complete drainage of raw materials from the various storage bins 35. Pressurised air may be blown up these chutes 55 to dislodge any remaining particles to ensure that all the material is drained out of the storage bins 35.

Ram actuators 56 are operable by the controller 15 for opening and closing the slide valves on the drain chutes 55. Pipes may be fitted to the drain chutes 55 to transport the raw materials from the storage bins 35 to a remote collecting station for re-use.

It will be appreciated that the various cleaning and drainage features of the present invention allow a blender to be readily, easily and quickly changed over between different processes. Also the various cleaning and draining operations can be synchronised and controlled from a remote location as required and may be at ground floor level thus avoiding the necessity of operators accessing elevated parts of the process for blender cleaning purposes which improves health and safety considerations.

Figure 13:
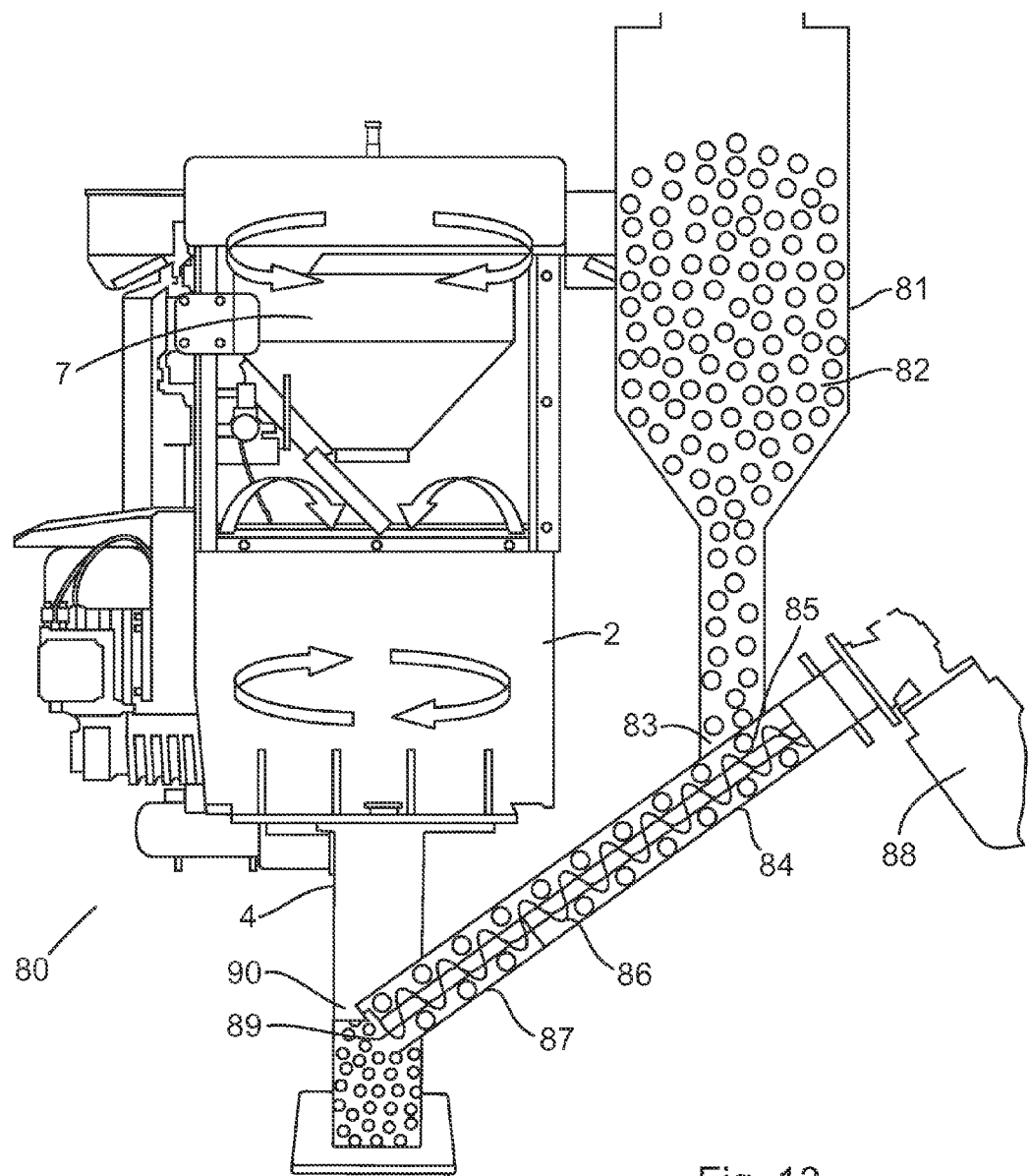
FIG. 13 is a partially sectioned elevational view of another blender.

FIG. 13 illustrates another blender 80. Parts similar to those described previously are assigned the same reference numerals. In this case a storage bin 81 of low bulk density material 82 is provided. An outlet 83 of the storage bin 81 discharges into an auger crammer 84 at an inlet 85 thereof. The auger crammer 84 has a screw 86 rotatably driven in an associated housing 87 by a drive motor 88. An outlet 89 of the auger crammer 84 discharges into an outlet duct 90 below the blender mixing chamber 2 material outlet 4 extending outwardly and downwardly from the outlet 4 for connection to a process line. Operation of the auger crammer 84 crams the low bulk density material into the duct 90.

Figure 14:
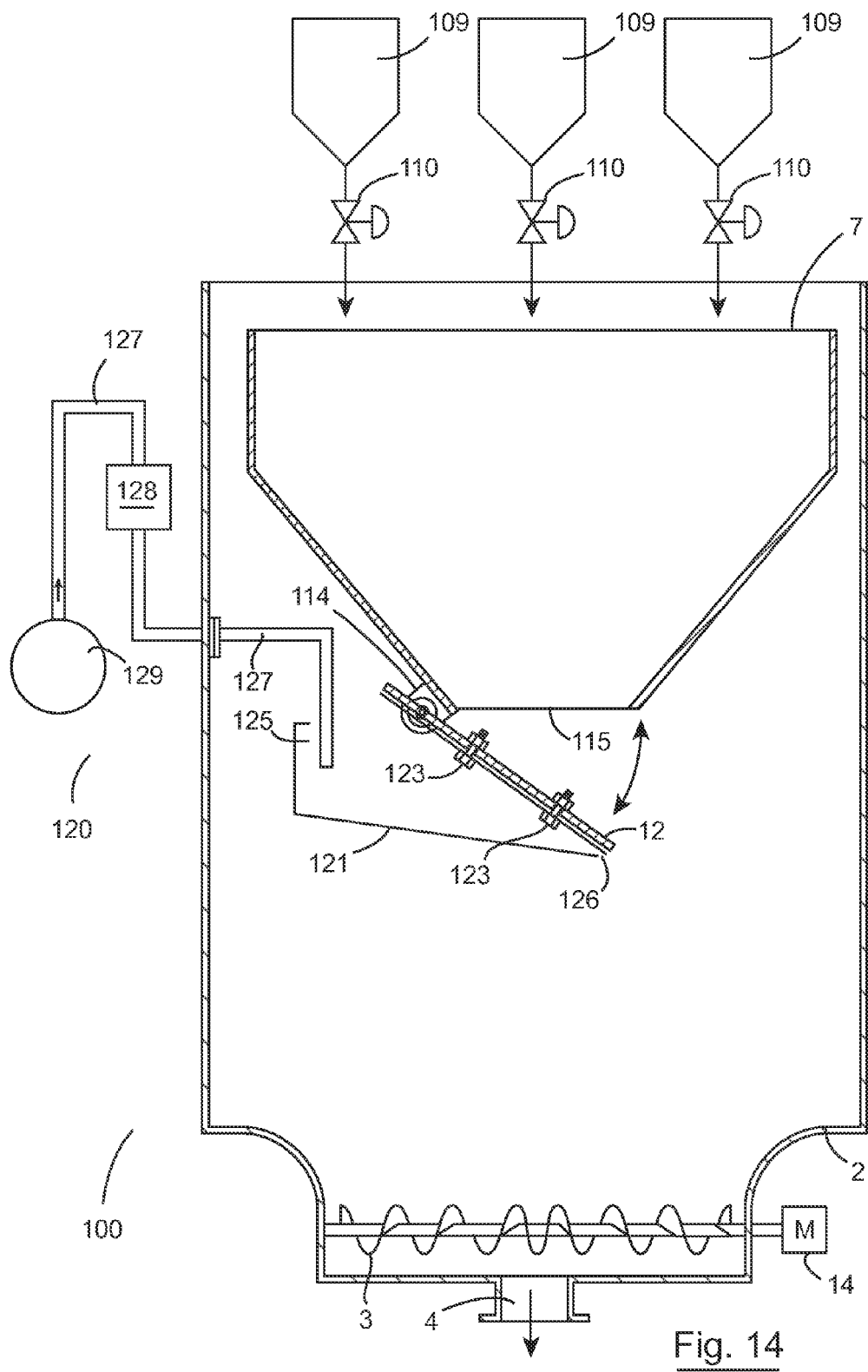
FIG. 14 is a schematic sectional elevational view of a further blender.

Referring to the FIG. 14 there is illustrated a batch blender indicated generally by the reference numeral 100. The blender 100 has a mixing chamber 2 for reception of ingredient materials to be blended. A mixing screw 3 driven by a motor 14 is rotatably mounted at the bottom of the mixing chamber 2. The mixing screw 3 is operable for circulation of ingredient material within the mixing chamber 2 for mixing the ingredient materials prior to discharge through an outlet 4 of the mixing chamber 2 into a processing line for example.

A weigh hopper 7 is suspended directly above the mixing chamber 2. A top of the weigh hopper 7 is open to receive dry ingredient materials from one or more dry ingredient material supply bins 109 mounted above the weigh hopper 7. Discharge of material from each bin 109 is through a control valve 110 which allows selection of one or more of the raw materials and controls the amount of raw material delivered to the weigh hopper 7 to form each batch of dry ingredient materials. Each control valve 110 is operably connected to the controller 15 which regulates operation of the control valves 110.

A dump flap 12 is mounted by a hinge 114 at an outlet 115 of the weigh hopper 7. This dump flap 12 can be pivoted by a ram or other means between a raised closed position sealing the outlet 115 and a lowered open position as shown in FIG. 14 for delivery of a batch of dry ingredient materials from the weigh hopper 7 to the mixing chamber 2.

In accordance with the present invention means, indicated generally by the reference numeral 120 is provided for delivering a measured quantity of a liquid ingredient material into the mixing chamber 2 with an associated measured batch of dry ingredient materials. This means 120 includes a liquid holding vessel 121 mounted on an underside of the dump flap 12, by bolts 123 for example. The liquid holding vessel 121 has an inlet 125 and an outlet 126. A liquid supply pipe 127 mounted on a side wall of the mixing chamber 2 and extending through the inlet 125 at a top of the liquid holding vessel 121 delivers a liquid ingredient material into the liquid holding vessel 121 through the inlet 125. A flow controller 128 is mounted in the supply line 127 to control delivery of liquid from a liquid source or reservoir 129 into the liquid holding vessel 121. The flow controller 128 may for example be a peristaltic pump. However, any other form of flow controller 128 which can be electrically controlled could alternatively be used. What is required is to be able to deliver a measured quantity of liquid into the liquid holding vessel 121 for subsequent delivery to the mixing chamber 2.

It will be noted that when the dump flap 12 is closed liquid is collected in the liquid holding vessel 121 which is in a filling position. When the dump flap 12 is opened as shown in the drawing the liquid holding vessel 121 is then moved into a pouring position for pouring liquid contents from the liquid holding vessel 121 through the outlet 126 into the mixing chamber 2 at the same time as the dry ingredient materials are being dumped from the weigh hopper 7 into the mixing chamber 2.

The various controls for forming a batch of selected dry ingredient materials in the weigh hoppers and for regulating delivery of batches into the mixing chamber 2 are as described in EP 0911130. Similar controls can be provided for matching a desired quantity of liquid ingredient material with a measured batch of dry ingredient materials.

In use, selected dry ingredient materials are delivered sequentially into the weigh hopper 7 according to a preset recipe. Similarly a liquid ingredient material is collected in the liquid holding vessel 121 in the required quantity corresponding to the batch of selected dry ingredient materials. Upon discharge of the batch of dry ingredient materials from the weigh hopper 7 into the mixing chamber 2 by opening the dump flap 12 the liquid ingredient in the liquid holding vessel 121 is also poured into the mixing vessel 2 with the dry ingredient materials for mixing prior to discharge through the outlet 4 into the process line.

During a material "fill cycle" each selected dry ingredient material is sequentially filled into the weigh hopper 7 as described in EP 0911130 and the liquid additive material is also filled via the flow controller 128 into the liquid holding vessel 121. The fill time or rate of each ingredient material may be varied for both the dry and liquid ingredients to achieve a desired blend ratio according to a preset recipe. When material is required for mixing by the process the weigh hopper 7 dump mechanism operates as normal discharging the dry ingredient materials from the weigh hopper 7 into the mixing chamber 2 and simultaneously discharging the liquid ingredient material from the liquid holding vessel 121 through the outlet 126 into the mixing chamber 2.

It will be appreciated that conventional batch blenders may be readily easily modified to incorporate the apparatus for adding liquid ingredient materials to the mixing chamber 2.

The liquid holding vessel 121 may be demountable for cleaning purposes if desired.

In an alternative arrangement it is envisaged that the liquid holding vessel 121 may be provided with a separate discharge valve for example a solenoid controlled valve.

Advantageously it is possible to feed liquid ingredient materials and to weigh same in a similar manner to the dry ingredient materials.

Figure 15:
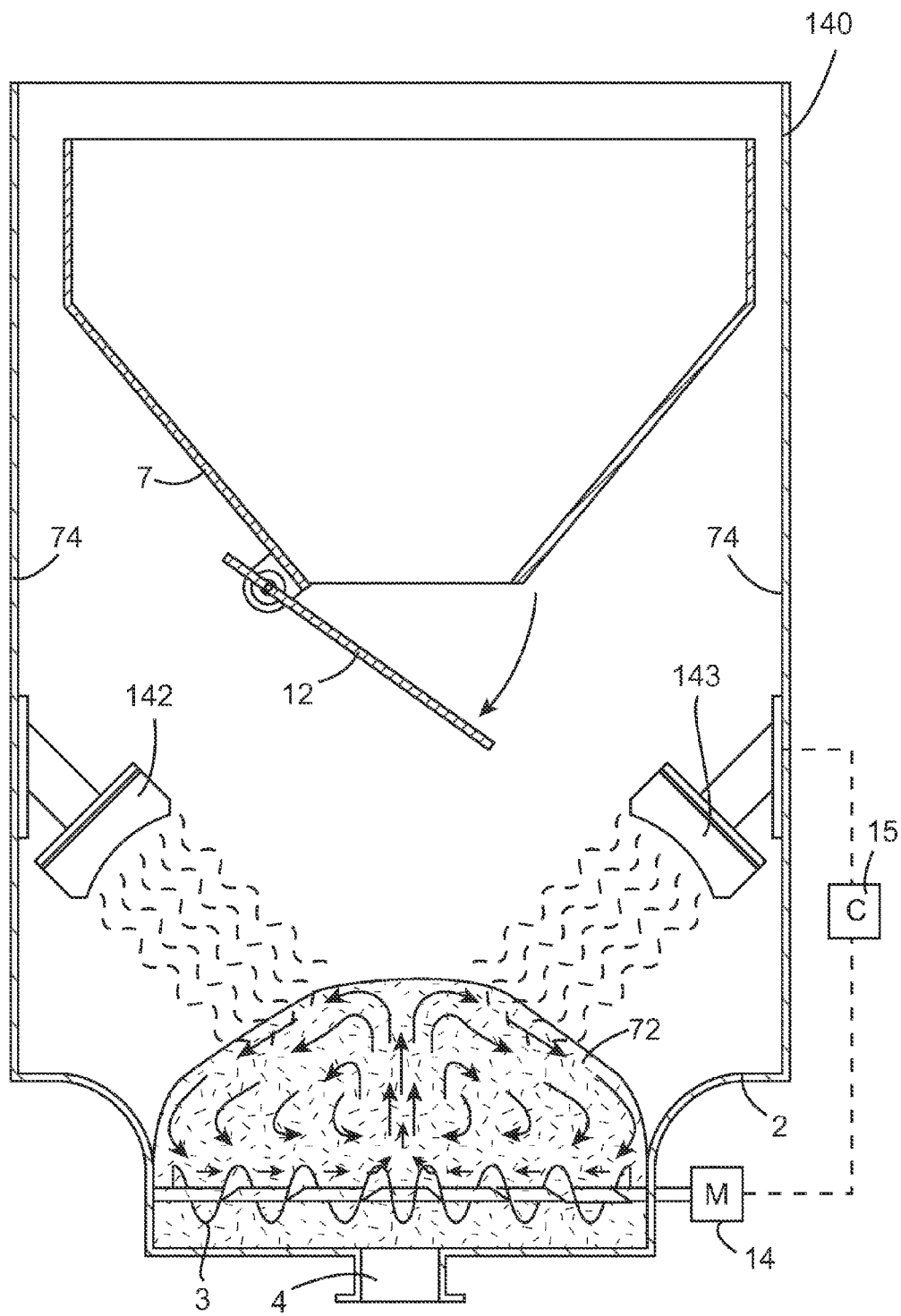
FIG. 15 is a schematic sectional elevational view of a blender according to the invention.

Referring now to FIG. 15 there is illustrated a blender according to the invention indicated generally by the reference numeral 140. Parts similar to those described previously are assigned the same reference numerals. The circulation of the material 72 for mixing by means of the mixing screw 3 is shown in the drawing. A pair of infra-red heaters 142, 143 are mounted on the side wall 74 of the mixing chamber 2 and arranged to direct radiant heat at the material 72 within the mixing chamber 2. As the material 72 is exposed to heat and re-circulated by the mixing screw 3 this will reduce the moisture content of the material 72 to a desired level. Ideally the heaters 142, 143 are connected to the controller 15 which is operable to control the heat input to the material 72 and also optionally to control the speed of the motor 14 operating the mixing screw 3 to control the drying rate and time. Thus it will be appreciated that accurate control of the moisture content of the material 72 immediately before it is injected into a process line can be achieved.

Figure 16:
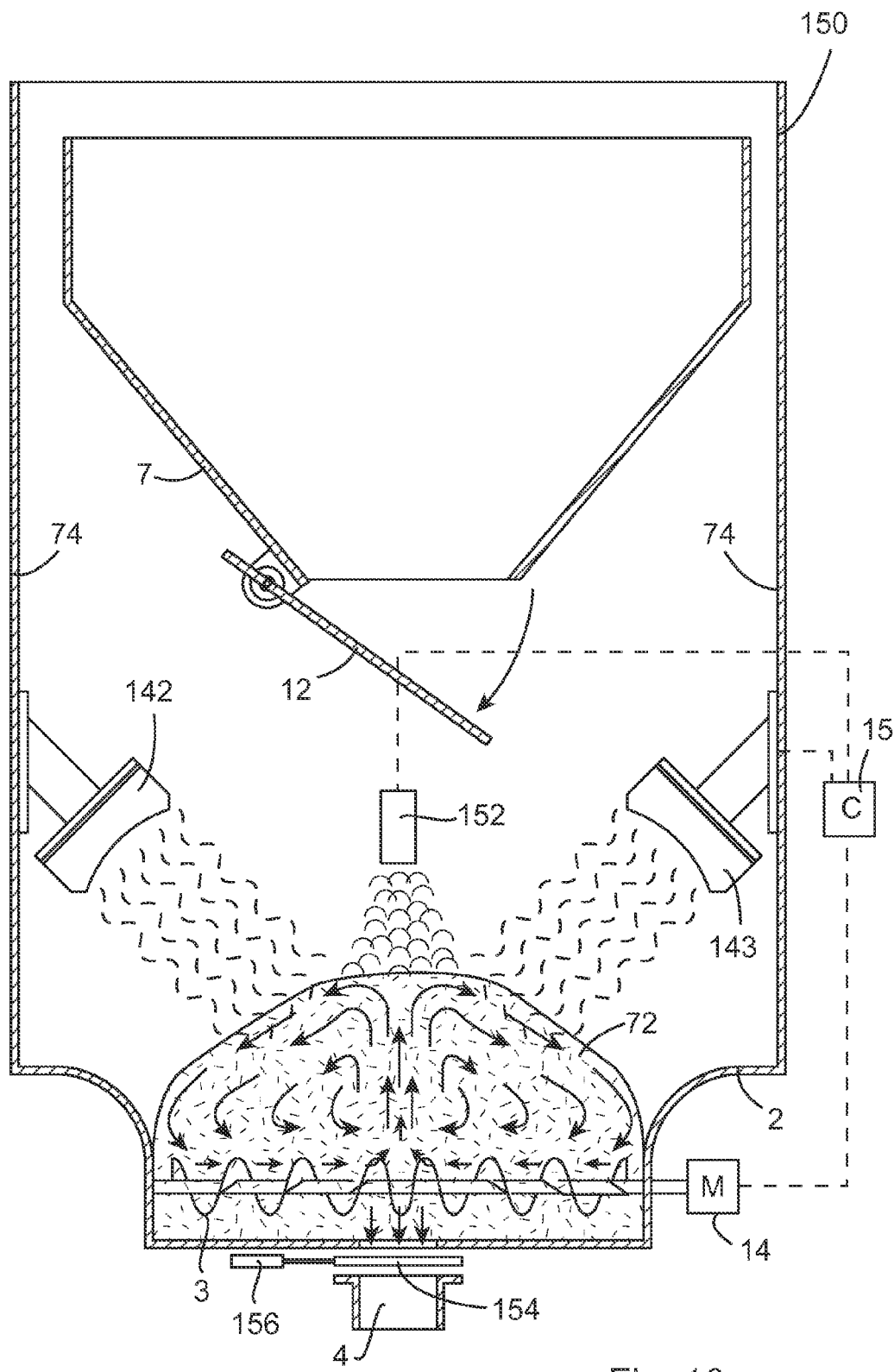
FIG. 16 is a view similar to FIG. 15 showing a blender according to a further embodiment of the invention.

Referring now to FIG. 16 there is shown another blender according to a second embodiment of the invention, indicated generally by the reference numeral 150. Parts similar to those described previously are assigned the same reference numerals. This is largely similar to the blender described previously with reference to FIG. 11. in this case a moisture content sensor 152 is mounted within the mixing chamber 2. This further aids in the accurate control of the moisture content of the material 72. The moisture content sensor 152 is connected to the controller 15 in order to control the drying rate and time, by adjusting the power of the heaters 142, 143 and/or the speed of the motor 14 as previously mentioned. The power of the heaters 142, 143 and the motor speed may be varied depending on the measured moisture content when compared to a set point error detected.

A sliding valve plate 154 can be mounted across the outlet 4 to control discharge of the materials 72 into a process line. The valve plate 154 is operable by a ram or solenoid actuator 156 for movement between open and closed positions.

Figure 17:
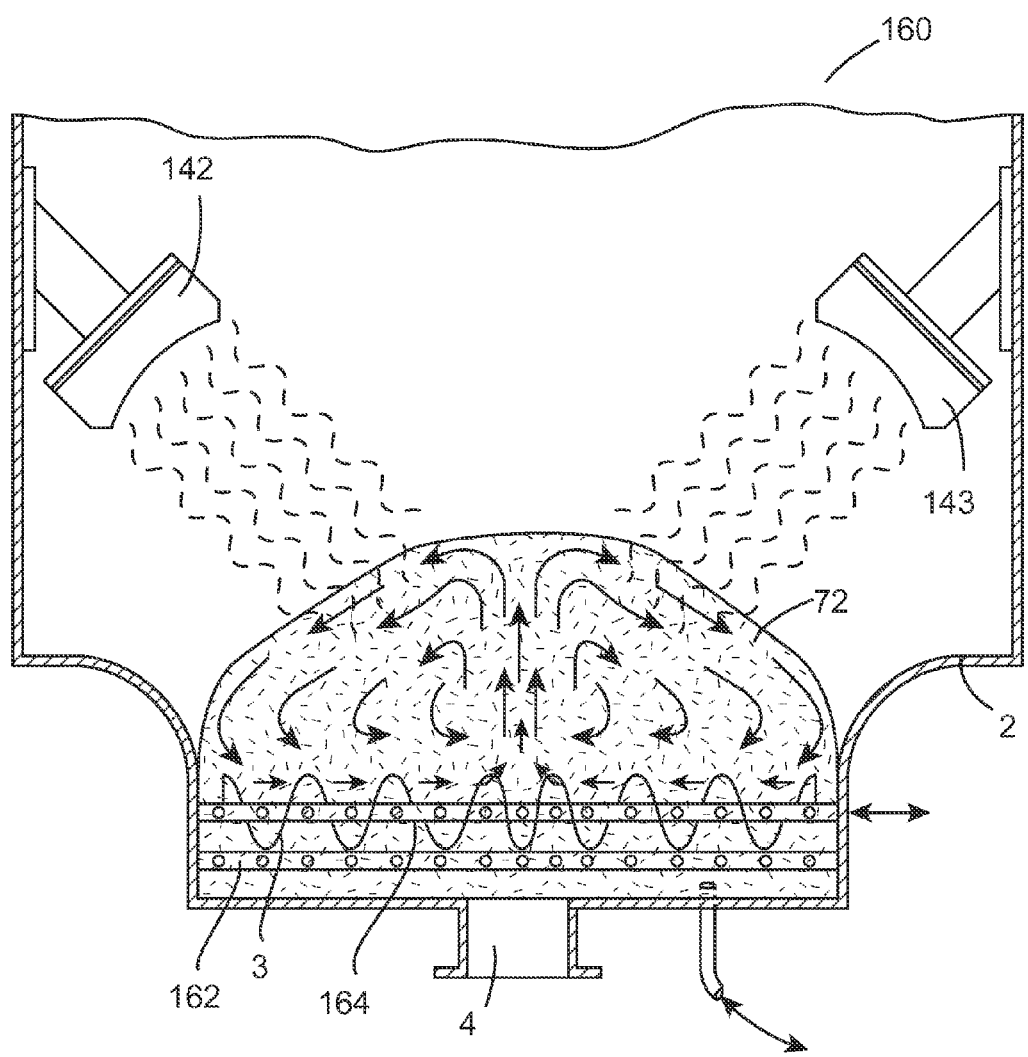
FIG. 17 is a schematic sectional elevational view of portion of another blender according to the invention.

Referring now to FIG. 17 there is shown a portion of another blender according to a third embodiment of the invention, indicated generally by the reference numeral 160. Parts similar to those described previously are assigned the same reference numerals. In this case a manifold 162 may be mounted at the bottom of the mixing chamber. The manifold 162 has a number of through holes for through passage of air or gas either into or out of the mixing chamber 2, again for controlling the moisture content of the interior of the mixing chamber 2 with a view to regulating the moisture content of the material 72. For convenience the manifold 162 may be integrally formed with a shaft 164 of the mixing screw 3.

It will be noted that the mixing chamber 2 may be sealed and either a vacuum or pressurised air applied to an interior of the mixing chamber 2 with a view to excluding exterior air from the mixing chamber 2 which would adversely affect the moisture content of the material 72 within the mixing chamber 2.

Figure 18:
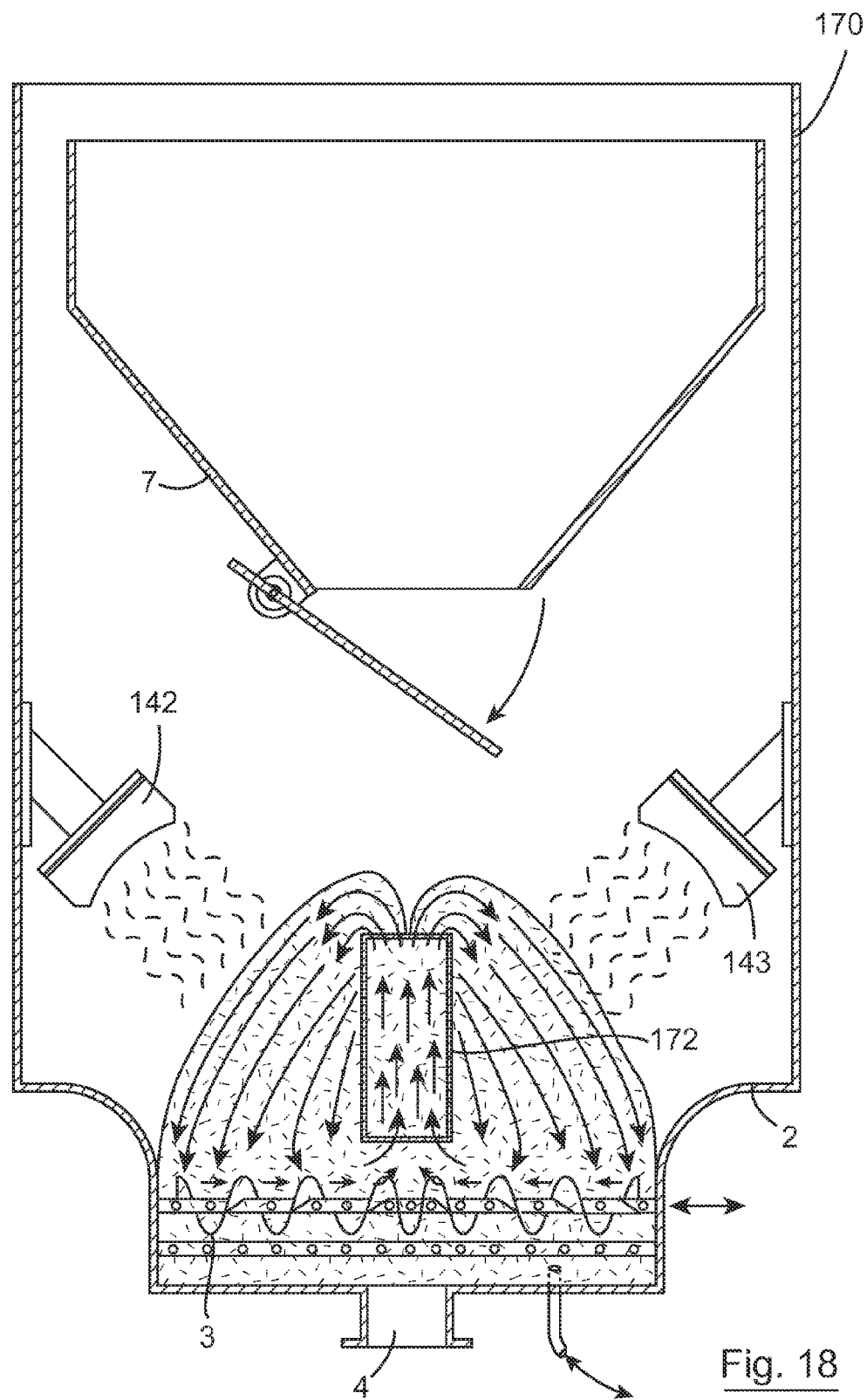
FIG. 18 is a schematic sectional elevational view of another blender according to the invention.

Referring now to FIG. 18 there is shown another blender according to a fourth embodiment of the invention indicated generally by the reference numeral 170. Parts similar to those described previously are assigned the same reference numerals. In this case a tubular feed controller 172 is mounted in an upright position centrally in the mixing chamber 2 immediately above the centre of the mixing screw 3 and above the outlet 4 of the mixing chamber 2. As material is directed inwardly and upwardly by the mixing screw 3 it travels upwardly through the feed controller 172, cascading outwardly and downwardly for recirculation by the mixing screw 3. The feed controller 72 may be of hollow construction and have holes in the side wall to form a manifold for the injection or extraction of air or gas to control the moisture content of the material 72 within the mixing chamber 2.

The invention is not limited to the embodiments hereinbefore described which may be varied in both construction and detail within the scope of the appended claims.

The invention claimed is:

1. A blender, including:
   a mixing chamber for reception of blend materials, the mixing chamber having a material outlet;
   a mixer mounted in the mixing chamber, said mixer being operable for mixing blend materials in the mixing chamber;
   a radiant heater mounted within the mixing chamber which is operable for regulating the moisture content of blend materials in the mixing chamber; and
   a material feeder for delivering blend materials from the mixing chamber to the material outlet,
   wherein the material feeder is a feed screw, the feed screw having a pair of opposed screws which are operable to direct material inwardly from each end of the feed screw to a central portion of the feed screw, said central portion being located at the material outlet.

2. The blender as claimed in claim 1, wherein the radiant heater is an infra red heater.

3. The blender as claimed in claim 2, wherein a pair of infra-red heaters are mounted on a side wall of the mixing chamber and arranged to direct radiant heat at the material within the mixing chamber.

4. The blender as claimed in claim 1, further comprising a gas transfer manifold mounted within the mixing chamber for injecting gas into the mixing chamber or extracting gas from the mixing chamber for regulating the moisture content within the mixing chamber.

5. The blender as claimed in claim 4, wherein the gas transfer manifold has a number of openings communicating with the mixing chamber, said gas transfer manifold being connected to a pump for injection or extraction of gas to or from the mixing chamber through the gas transfer manifold.

6. The blender as claimed in claim 1, further including a controller operably connected to the radiant heater for regulating the moisture content of blend materials within the mixing chamber.

7. The blender as claimed in claim 6, wherein the controller is operably connected to the mixer for regulating the speed of the mixer to control the moisture content of blend materials in the mixing chamber.

8. The blender as claimed in claim 1, wherein a moisture content sensor is mounted within the mixing chamber and the radiant heater is operable in response to the sensed moisture content to maintain blend materials within the mixing chamber at a pre-set desired moisture content.

9. The blender as claimed in claim 1, wherein a sliding valve plate is mounted at the material outlet of the mixing chamber, an actuator connected to the valve plate being operable to slide the valve plate between an open position and a closed position across the material outlet.

10. The blender as claimed in claim 1, wherein the mixer and the material feeder are integral.

11. The blender as claimed in claim 1, having a weigh hopper above the mixing chamber for weighing a batch of raw material and delivering said batch to the mixing chamber, a material level sensor being located above the material in the mixing chamber below the weigh hopper, the level sensor being operable to provide a continuous reading of the material level in the mixing chamber.

12. The blender as claimed in claim 1, wherein the blender has a plurality of material handling compartments, one or more cleaning air jets being provided at each compartment, said air jets being operable to direct material towards an outlet of the compartment, means for connecting said cleaning air jets to a pressurised air supply, and valve means to control delivery of pressurised air to each cleaning air jet.

13. A blender, including:
   a mixing chamber for reception of blend materials, the mixing chamber having a material outlet;
   a mixer mounted in the mixing chamber, said mixer being operable for mixing blend materials in the mixing chamber;
   a radiant heater mounted within the mixing chamber which is operable for regulating the moisture content of blend materials in the mixing chamber;
   a material feeder for delivering blend materials from the mixing chamber to the material outlet; and
   a baffle mounted in the mixing chamber at the material outlet, adjacent the material outlet but spaced-apart from the material outlet, the material feeder having a discharge portion which is mounted between the baffle and the material outlet.

14. The blender as claimed in claim 13, further comprising a gas transfer manifold mounted within the mixing chamber for injecting gas into the mixing chamber or extracting gas from the mixing chamber for regulating the moisture content within the mixing chamber.

15. The blender as claimed in claim 13, further including a controller operably connected to the radiant heater for regulating the moisture content of blend materials within the mixing chamber.

16. The blender as claimed in claim 13, wherein a moisture content sensor is mounted within the mixing chamber and the radiant heater is operable in response to the sensed moisture content to maintain blend materials within the mixing chamber at a pre-set desired moisture content.

17. A blender, including:
   a mixing chamber for reception of blend materials, the mixing chamber having a material outlet;
   a mixer mounted in the mixing chamber, said mixer being operable for mixing blend materials in the mixing chamber;
   a radiant heater mounted within the mixing chamber which is operable for regulating the moisture content of blend materials in the mixing chamber; and
   a material feeder for delivering blend materials from the mixing chamber to the material outlet,
   wherein said material feeder is operable to direct portion of the material towards the outlet and portion of the material away from the outlet for re-mixing in the mixing chamber, an upright tubular feed controller mounted above the outlet for directing material away from the outlet, said tubular feed controller being of double walled construction and having openings in a side wall thereof to form a manifold for injecting air or gas.

18. The blender as claimed in claim 17, further comprising a gas transfer manifold mounted within the mixing chamber for injecting gas into the mixing chamber or extracting gas from the mixing chamber for regulating the moisture content within the mixing chamber.

19. The blender as claimed in claim 17, further including a controller operably connected to the radiant heater for regulating the moisture content of blend materials within the mixing chamber.

20. The blender as claimed in claim 17, wherein a moisture content sensor is mounted within the mixing chamber and the radiant heater is operable in response to the sensed moisture content to maintain blend materials within the mixing chamber at a pre-set desired moisture content.

* * * * *